United States Patent [19]
Roth

[11] 4,042,751
[45] Aug. 16, 1977

[54] MOULDED PANEL AND THE METHOD OF ITS MANUFACTURE

[76] Inventor: Jacques Roth, 13, quai Mullenheim, Strasbourg (Bas-Rhin), France

[21] Appl. No.: 646,929

[22] Filed: Jan. 6, 1976

[30] Foreign Application Priority Data

Feb. 5, 1975    France .................................. 75.05063

[51] Int. Cl.² .......................... B32B 27/40; B32B 3/26
[52] U.S. Cl. .............................. 428/425; 260/2.5 BE; 264/321; 428/310; 428/311
[58] Field of Search ................. 428/99, 103, 310, 315, 428/317–318, 311, 305, 212, 218, 425; 264/137, 321; 260/2.5 BE

[56] References Cited

U.S. PATENT DOCUMENTS

| | | | |
|---|---|---|---|
| 3,811,996 | 5/1974 | Polk ................................. | 428/310 X |
| 3,833,259 | 9/1974 | Pershing .......................... | 428/310 X |
| 3,844,876 | 10/1974 | Wilson et al. ................... | 428/315 X |
| 3,867,492 | 2/1975 | Drostholm ....................... | 428/310 X |
| 3,944,704 | 3/1976 | Dirks .............................. | 264/321 X |

*Primary Examiner*—William J. Van Balen
*Attorney, Agent, or Firm*—Young & Thompson

[57] ABSTRACT

At least one polyurethane cellular support sheet is impregnated in different zones with one or more polymerizable polyurethane mixtures and then molded while polymerization occurs to produce a shaped panel with zones or portions of different stiffness, and with or without one or more cover materials or inserts or fastening elements.

6 Claims, 4 Drawing Figures

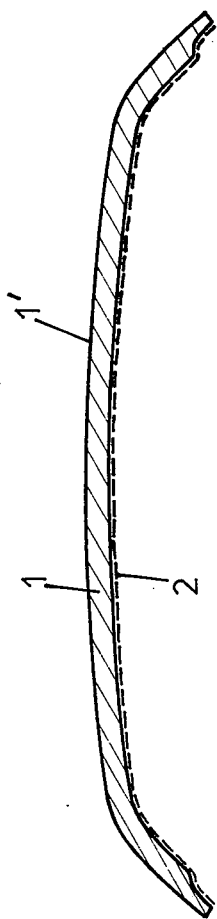
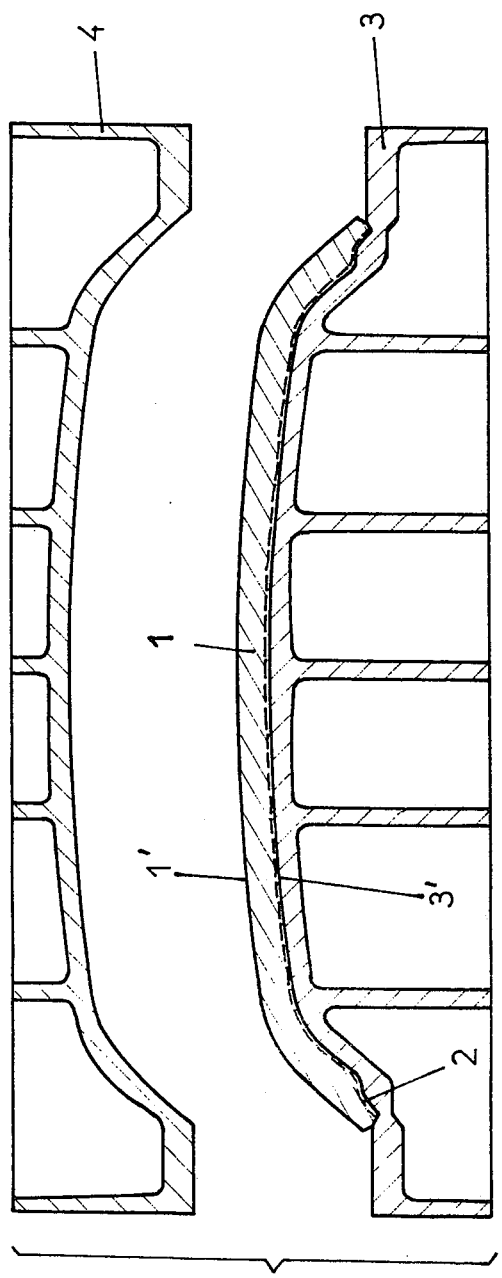

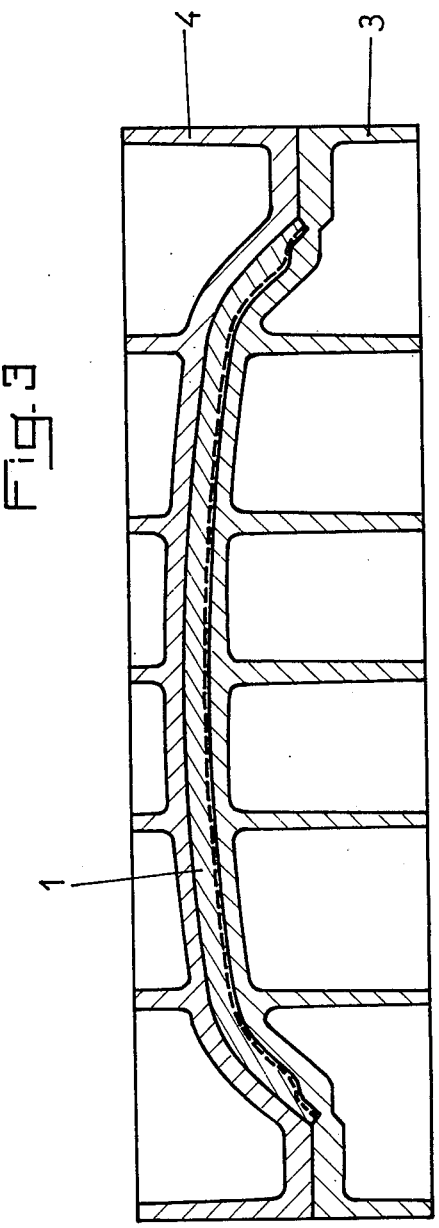
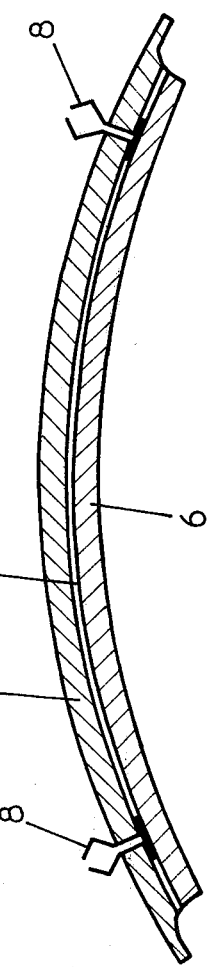

MOULDED PANEL AND THE METHOD OF ITS MANUFACTURE

INTRODUCTION AND BACKGROUND OF THE INVENTION

The present invention relates to the manufacture of moulded panels in the form of squabs covered during their manufacture with a finishing material such as, for example, simulation leather, textile fabric, or the like, and utilised notably as wall coverings, false ceilings, screens, and panels for covering doors or roofs of automobile vehicles.

In present practice such panels are manufactured according to various processes.

According to one of these processes, the panels are made by casting a foaming mixture of polyurethane in a mould of which the bottom is covered by a film of polyvinyl chloride or of fabric rendered fluid-tight. The expansion and the polymerisation with heat or whilst cold of the foam in the closed mould make it possible thus to obtain, according to the selection of the foaming mixture utilised, a panel of foam which is supple or flexible or semi-stiff or stiff.

However, this process does not make it possible to make panels which for a constant thickness present different degrees of flexibility. On the other hand it is scarcely possible to introduce into the panels, during their manufacture, according to this process, inserts ultimately serving for their fixation.

In order to mitigate these disadvantages, the invention has as one object to provide a method of manufacturing panels which is simple and quick to put into practice, is of a relatively low cost, and due to which it is possible to manufacture panels capable of presenting different degrees of flexibility for a constant thickness.

Equally the invention has as another object to provide any panel made according to this method by way of a new industrial product.

BRIEF SUMMARY OF THE INVENTION

According to the invention there is employed a method of manufacturing shaped panels, characterised in that it comprises the steps of:

causing to penetrate intimately into the cells of the constitutive mass of a support, of foamed polyurethane, at selected places, either by sprinkling or coating or dipping and subsequent passage between compressing rollers, polyurethane impregnation products intended to give to the support the desired degrees of suppleness or stiffness at the said places, placing this support, preferably when the impregnation products pass from the liquid state and reach the sticky state during polymerisation, in one of the parts of a mould, for example the lower part, provided with a covering material, and closing the said mould in order to give the desired shape to the support, stabilised by the polymerisation of the impregnation products, either at the ambient temperature or by heating.

Further features of the invention appear from the following description and the appended claims.

The following description relates to a method of manufacturing a panel forming a roof lining or other part of an automobile vehicle, given by way of non-limitative example and explained with reference to the accompanying drawings.

BRIEF DESCRIPTION OF THE VIEWS IN THE DRAWINGS

In the accompanying drawings

FIG. 1 is a view in section of a panel manufactured by the method according to the invention, FIG. 2 is a view in section of an open mould with the support serving for the manufacture of the panel, FIG. 3 is a view analogous to FIG. 2 but with the mould represented in the closed position, and FIG. 4 is a view in section of a panel manufactured by the method according to the invention and provided with inserts for its fixation.

DETAILED DESCRIPTION OF THE PREFERRED EMBODIMENTS

As FIG. 1 shows, the panel which is the subject of the present invention is constituted by a support 1 forming the bulk of the panel, by impregnation products intended to give to the support the different degrees of flexibility or rigidity as desired and to fix the shape of the panel, and by a finishing material 2 such as, for example, simulation leather or textile fabric or the like secured to the support 1 by the aid of the impregnation products, the surface of the support which is invisible during the utilisation of the same being also covered by any secondary finishing material such as paper or cardboard secured to the support by means of the impregnation products.

By way of example of putting the invention into practice, it is possible to utilise as the support a sheet of foamed polyurethane which is flexible or semi-stiff, but preferably flexible and of a low specific gravity or density such as, for example, 1.25 lb/ft$^3$.

As regards the impregnation product, it is according to the invention preferably constituted by a mixture of polyol, isocyanate, a catalyst such as octoate of tin, and a sufficient quantity of trichlorofluoromethane or analogous substance serving to dilute the mixture and to provide the appropriate viscosity in order for the mixture to penetrate intimately into all the cells of the support. The trichlorofluoromethane, which has been selected for its excellent miscibility with the mixtures of polyol and isocyanate can be replaced, for example, by methylene chloride or analogous material.

The ingredients and proportions of such an impregnation product may, for example, be as follows:

100 Parts of polyol of the triol or quadrol type, 85 parts of isocyanate of the methyl-phenyl-diisocyanate type, 0.05 to 0.1 parts of a catalyst which may be an organic salt of tin such as the octoate of tin or the naphthenate of tin or the naphthenate of lead or analogous material, 5 to 20 parts of trichlorofluoromethane ("Freon 11") or methylene chloride or analogous material intended to dilute the solution or mixture, in quantities amounting to about 70 parts being able to be utilised notably in instances where the impregnation product is added to the support by immersion.

The obtaining of the different degrees of flexibility or stiffness at the predetermined portions of the panel is possible by the utilisation in the impregnation products of polyols of different qualities.

For the manufacture of a panel in accordance with the invention and as described above, it is possible to proceed as follows:

The support 1 is cut out from a sheet of foamed polyurethane to the desired dimensions and sprinkled on its two sides at the places where it is to be given different degrees of flexibility with the corresponding impregnation mixture. Thus, in the zone in which the panel is to remain flexible there is utilised an impregnation mixture containing soft or supple polyol, in the zone where the panel is to be given a semi-stiff structure there is utilised a mixture containing semi-stiff polyol, and in the zone which is to be stiff there is utilised a mixture resulting in stiff polyol.

This sprinkling of the support 1 can be effected by means of known machines, such as a sprinkling machine with two or more components of a kind such that the polyol previously mixed with the catalyst and the trichlorofluoromethane but not yet in contact with the isocyanate until the actual moment of sprinkling is duly applied thanks to the mixing head with which the machine is equipped, or by a coating machine of which the coating rollers are supplied by a casting head mounted for reciprocation, or by an immersion installation in which the support is immersed in a bath of the impregnation mixture then squeezed out between rollers in order to expel the excess mixture.

After this operation of sprinkling or of covering or of immersion making it possible to obtain a support of foamed polyurethane impregnated with the mixture and, preferably, as soon as the impregnation mixture, during its polymerisation, arrives at the sticky state, the support is placed in the mould 3 of which the bottom 3' is previously provided with a material 2 for ornamentation or finishing.

In a modification, the support 1 can equally well be placed upon the material 2 for ornamentation previously to being placed in the mould 3, this manner of operation avoiding nearly all risk of faulty folding in the material 2 for ornamentation.

The mould 3 is then closed by its cover 4 and the polymerisation of the impregnation mixture takes place, either at the ambient temperature of under the effect of heating which accelerates the process.

In the instance where the invisible surface 1' of the support 1 is also to be covered with a finishing material, the latter is placed upon the support prior to the closing of the mould by its cover. Naturally it will be equally possible to manufacture a panel without finishing material, in which case the base of the mould 3 and the interior surface of the cover 4 of the mould are coated with a demoulding agent, such as an emulsion of wax.

In conformity with a further feature of the invention, it is likewise possible to manufacture panels each constituted by two sheets of foamed material 5, 6 sprinkled with the impregnation mixture and placed one upon the other with the interpositioning between them of an insert such as a textile fabric 7 or a sheet of cardboard or the like intended to strengthen the panel and to increase its resistance to bending and to tearing. It is also possible to dispose between the two sheets 5 and 6 inserts such as fastening elements or clips 8 which can serve for the fixing in place of the panel.

It will be understood that the invention is not limited to the examples described above and illustrated, and that various modifications remain possible without departing in any way from the scope of protection as defined in the appended claims.

Thus, for example, the number of supports 1 for example impregnated cellular sheets, constituting the panel can be increased to more than two, and more particularly there can be utilised a moulding offering several different strengths or thicknesses.

What is claimed is:

1. A method of manufacturing shaped panels, comprising impregnating selected portions of a flexible sheet of foamed polyurethane with a polymerizable mixture of isocyanate, polyol, catalyst and a diluent, placing said sheet in a mold, closing the mold in order to impart to the sheet a predetermined desired shape, opening the mold and removing the sheet from the mold when the polymerizable mixture has polymerized, thereby to produce a flexible sheet having different degrees of flexibility over different areas of the sheet.

2. A method as claimed in claim 1, and impregnating different portions of the area of the sheet with impregnation mixtures of isocyanate, polyol, catalyst and a diluent so selected as to produce a flexible polyol, a semi-stiff polyol and a stiff polyol upon impregnation of said mixture, thereby to impart different degrees of stiffness to predetermined areas of the sheet.

3. A method as claimed in claim 1, in which said mixture consists essentially of 100 parts by weight of polyol, 85 parts by weight of isocyanate, 0.05 – 0.1 parts by weight of catalyst, and 5 to 20 parts by weight of diluent.

4. A method as claimed in claim 3, in which said polyol is a triol or quadrol, said isocyanate is methyl-phenyl-diisocyanate, said catalyst is tin octoate, and said diluent is trichlorofluoromethane.

5. A method as claimed in claim 1, comprising assembling two said sheets with the interpositioning of an insert between them.

6. A shaped panel of varying flexibility produced by the method of claim 1.

* * * * *